(12) United States Patent
Farkas (10) Patent No.: US 7,847,423 B1
(45) Date of Patent: Dec. 7, 2010

(54) BACKUP POWER SYSTEM

(76) Inventor: Otto Farkas, 1749 SE. 44th Ter., Cape Coral, FL (US) 33904

( * ) Notice: Subject to any disclaimer, the term of this patent is extended or adjusted under 35 U.S.C. 154(b) by 353 days.

(21) Appl. No.: 12/213,593

(22) Filed: Jun. 23, 2008

(51) Int. Cl.
*H02J 9/00* (2006.01)

(52) U.S. Cl. ....................................................... 290/31

(58) Field of Classification Search .................... 290/31
See application file for complete search history.

(56) References Cited

U.S. PATENT DOCUMENTS

| | | | |
|---|---|---|---|
| 4,827,152 A * | 5/1989 | Farkas | 307/68 |
| 5,311,062 A | 5/1994 | Farkas | |
| 5,434,454 A | 7/1995 | Farkas | |
| 6,288,456 B1 * | 9/2001 | Cratty | 307/64 |
| 6,563,229 B2 * | 5/2003 | Farkas | 290/30 A |
| 6,611,068 B2 * | 8/2003 | Cratty | 307/64 |
| 7,042,108 B2 | 5/2006 | Farkas | |
| 7,459,803 B2 * | 12/2008 | Mosman | 307/64 |
| 7,521,902 B2 * | 4/2009 | Wiegman et al. | 322/14 |

2007/0270270 A1 * 11/2007 Miller et al. ................ 475/189

* cited by examiner

*Primary Examiner*—Joseph Waks
(74) *Attorney, Agent, or Firm*—Paul R. Martin (57) ABSTRACT

A backup power system is connected in parallel to a load, which is powered via a power line connecting that load to a main power source, such as a utility. The backup system includes a generator/condenser unit that is coupled to a flywheel unit to maintain the flywheel of that flywheel unit rotating at a preset speed during normal power system operation and is also connected to a thermal engine to supply power to the load via the generator/condenser unit when there is an interruption of power from the main power source. A shaft-coupling unit couples the generator/condenser unit to the flywheel unit. The shaft-coupling unit includes a sensor plate. When there is a difference in rotational speed between the flywheel and the motor/generator, as would be caused due to a main power unit operating at a level other than a predetermined level, this differential rotational speed is translated by the coupling unit into linear movement of the sensor plate. The position of the sensor plate is monitored, and when the sensor plate moves linearly beyond a preset amount, a circuit generates a signal, which activates the thermal engine.

15 Claims, 7 Drawing Sheets

BACKUP POWER SYSTEM

TECHNICAL FIELD OF THE INVENTION

The present invention relates to the general art of electrical transmission, and to the particular field of emergency and standby electrical power.

BACKGROUND OF THE INVENTION

As discussed in U.S. Pat. Nos. 7,042,108 and 6,563,229, the disclosures of which are incorporated herein by reference, sensitive loads, such as computers, data processing equipment, communications equipment, and the like, require stable and uninterrupted power. Accordingly, many such items include battery backup power supplies. However, battery power is not sufficient for large power grids, such as might be associated with utility power sources. Furthermore, battery failures due to constant charging are a common problem in the standby power generation industry and thus battery backup systems may have problems, including reliability problems.

Therefore, there is a need for a standby and backup power system that does not require batteries.

Synchronous condensers and synchronous motors are used on power systems where large amounts of reactive KVA are needed for power factor correction and voltage regulation. A synchronous condenser is similar to a synchronous motor, but is built to operate without a mechanical load, primarily to supply reactive KVA, which is main component of voltage regulation and stabilization. For example, on a decrease of Line Voltage down to 70% of rated, the leading reactive component of a leading power factor machine will increase maintaining constant voltage to the load to which it is connected. On over voltage, for example up to 10% of rated, the reactive component of a leading power factor machine will decrease maintaining constant voltage to the load to which it is connected. Synchronous condensers, due to their low impedance and ability to generate reactive KVA will protect a load by filtering out transients and maintaining constant voltage during sags and interruptions. However, during longer interruption of utility power, synchronous condensers may be inadequate.

Synchronous machines are also ideal components in dynamic No-Break or Continuous power systems since they can constantly rotate on a line connected to the utility with the load being a condenser or a generator.

Therefore, large systems often utilize rotating continuous electric power generation systems as a source of standby or backup power. Such standby or backup power systems are connected in parallel with utility power. Such systems must constantly monitor voltage, frequency and power shape and should be able to detect irregularities and disconnect instantly from the utility when an indicia of power falls below a preset value or when power is interrupted.

When a synchronous condenser is coupled to a mechanical load for use in a continuous or no-break power system, during voltage sags or interruptions, the mechanical load will instantly turn the condenser into a generator. This will change the Vector and the Power Factor of the machine. Therefore, instead of generating the leading reactive current necessary for voltage regulation, it begins to generate KW. Once the condenser turns into a generator, the re-connect of the utility out of phase becomes a critical issue.

Power failure detection and isolation from utility source in time is a critical function for any rotating continuous power system since the synchronous machine (motor) instantly turns into a generator when electric drive power to it is interrupted. If a utility breaker is not immediately opened, the generator will back feed the entire grid and may also fail due to overload.

Therefore, rotating power protection systems use a variety of means to provide such immediate interruption. For example, some systems use computers and other digital equipment to monitor the power quality and send and receive signals to and from remote locations. The power to drive these devices usually comes from the generator. However, once the generator is connected in parallel to the utility, any disturbance on the utility line, such as lightning strikes or the like, may have direct consequences on these very same monitoring and protection devices. In some cases, these devices may fail to detect a power interruption in time or fail completely due to problems associated with their configurations and connections to the system. Such failure will render the entire power protection system useless.

In order to overcome some of the problems discussed above, some systems include a taped series reactor between the utility, the generator and the load. These systems are sometimes called "isolating couplings" or "line-interactive filters." With this configuration, voltage between the line and the tap is monitored as well as between the generator and the tap. The reactor will always provide a preset power factor and generate reactive power in both the line and the load direction in order to minimize possible damage during momentary interruptions as well as to provide reactive power for load regulation.

There are several problems with this solution. The inductor changes the load impedance during both normal and/or during emergency power generation and limits the short circuit clearing ability of the system or necessary current required for motor starting and other inductive type equipment thereby limiting its applications.

A-C frequency sensing switches are also used for power failure sensing. When power to a synchronous motor is interrupted, the rotating field of the machine begins to slow thereby generating lower frequency. Normally, these devices are set to disconnect the load and the machine from the utility at 59.9 Hz in a 60 Hz system. This only allows 0.5 Hz frequency deviations. However, during peak load conditions, it is quite common to have utility frequency variations of 0.5 Hz. Therefore, using any type of frequency or shift speed sensing device as a primary and only sensing method can be unreliable.

A solution is described in U.S. Pat. No. 5,684,348 which discloses a rotating field of a synchronous machine or coupling with a built in mechanical switch. The mechanical switch is allowed 90° electrical slip so that at the end of the slip, the switch can send a signal to isolate the machine from a faulty circuit. However, there are several problems with this approach. First, it may be difficult and costly to integrate a mechanical switch into a rotating Field of a generator or even a coupling and be able to send a contact signal. Furthermore, the described 90° electrical slip represents 0.5 Hz frequency loss even before the breaker open signal can be generated. Furthermore, the possibility of a utility re-connect at 90° out of phase may damage and may even destroy the coupling of the switch, or may even bend the shaft of the machine as well as create large transients.

Therefore, the amount of slack within the coupling should be minimized to maintain closer frequency regulation but long enough to provide the transitional KVA until the system is isolated from the faulty source.

Therefore, there is a need for a power system that is equipped with a positive failsafe system for monitoring and power failure sensing along with a reliable source of energy to start a standby machine.

More specifically, there is a need for a power system that is equipped with a positive failsafe system for monitoring and power failure sensing along with a reliable source of energy to start a standby thermal engine.

While the systems disclosed in the incorporated patents, U.S. Pat. Nos. 6,653,229 and 7,042,108 provide excellent solutions to the above-discussed problems, there is room for improvement in this field. In some situations, a mechanical means for detecting slip between a main power source and a flywheel is more reliable than an electronic means.

OBJECTS OF THE INVENTION

It is a main object of the present invention to provide a power system that is equipped with a positive failsafe system for monitoring and power failure sensing along with a reliable source of energy to start a standby machine.

It is another object of the present invention to provide a power system that is equipped with a positive failsafe system for monitoring and power failure sensing along with a reliable source of energy to start a standby machine that is improved over electrical systems.

It is another object of the present invention to provide a power system that is equipped with a positive failsafe system for monitoring and power failure sensing along with a reliable source of energy to start a standby thermal engine.

It is another object of the present invention to provide a power system that is equipped with a mechanical failsafe system for monitoring and power failure sensing along with a reliable source of energy to start a standby thermal engine.

It is another object of the present invention to provide a power system that is equipped with a positive failsafe system for monitoring and power failure sensing along with a reliable source of energy to start a standby thermal engine and which provides an accurate and predictable ride-through.

It is another object of the present invention to provide a positive failsafe system for monitoring and power failure sensing for a backup power system.

It is another object of the present invention to provide a positive failsafe system for monitoring and power failure sensing for a backup power system which includes a phase shift coupling which has a precise phase shift angle indicator and can be used for all synchronous machines while operating in parallel with other synchronous machines.

It is another object of the present invention to provide a positive failsafe system for monitoring and power failure sensing for a backup power system, which allows a synchronous condenser to make a smooth transition to a synchronous generator without any voltage loss or without generating any transients during power interruptions.

It is another object of the present invention to provide a positive failsafe system for monitoring and power failure sensing and which includes a synchronous motor for a backup power system which protects the synchronous motor from pulling out of step.

It is another object of the present invention to provide a positive failsafe system for monitoring and power failure sensing and which includes a synchronous motor for a backup power system and which protects the synchronous motor from re-connecting to utility power out of phase.

It is another object of the present invention to provide a positive failsafe system for monitoring and power failure sensing for a backup power system which utilizes a thermal engine and which provides a correct anticipated load change signal to maintain constant speed of the thermal engine while permitting the thermal engine to operate efficiently.

SUMMARY OF THE INVENTION

These, and other, objects are achieved by a backup power system that includes a thermal motor and a flywheel system connected to a motor/generator (also referred to in this disclosure as a generator/condenser) via a mechanical coupling that uses a mechanical means to sense slip between the flywheel system and the motor/generator. The mechanical means translates slip, as manifested in a difference in rotational speed between the flywheel of the flywheel system and the motor/generator, into linear displacement of an element and then monitors the linear displacement. When the element moves more than a preset amount, the backup power system is activated. Thus, when the difference between motor/generator rotation and flywheel rotation reaches a pre-set value, the thermal motor is activated and power is supplied by the motor/generator from the thermal engine. The flywheel in the flywheel system can supply power to the motor/generator in the manner of a ride through system. The mechanical coupling is thus driven by the generator/condenser during normal operation, and is driven by the flywheel during a ride through period, and is thereafter driven by the thermal engine. The control circuit also disconnects the system from the remainder of the power grid when the system is being used in a backup mode.

Using the backup power system embodying the present invention will thus accurately and reliably connect a backup power generator to a load and yet is not complicated or costly to install.

DETAILED DESCRIPTION OF AN EMBODIMENT OF THE INVENTION

Other objects, features and advantages of the invention will become apparent from a consideration of the following detailed description and the accompanying drawings.

Figure 1:
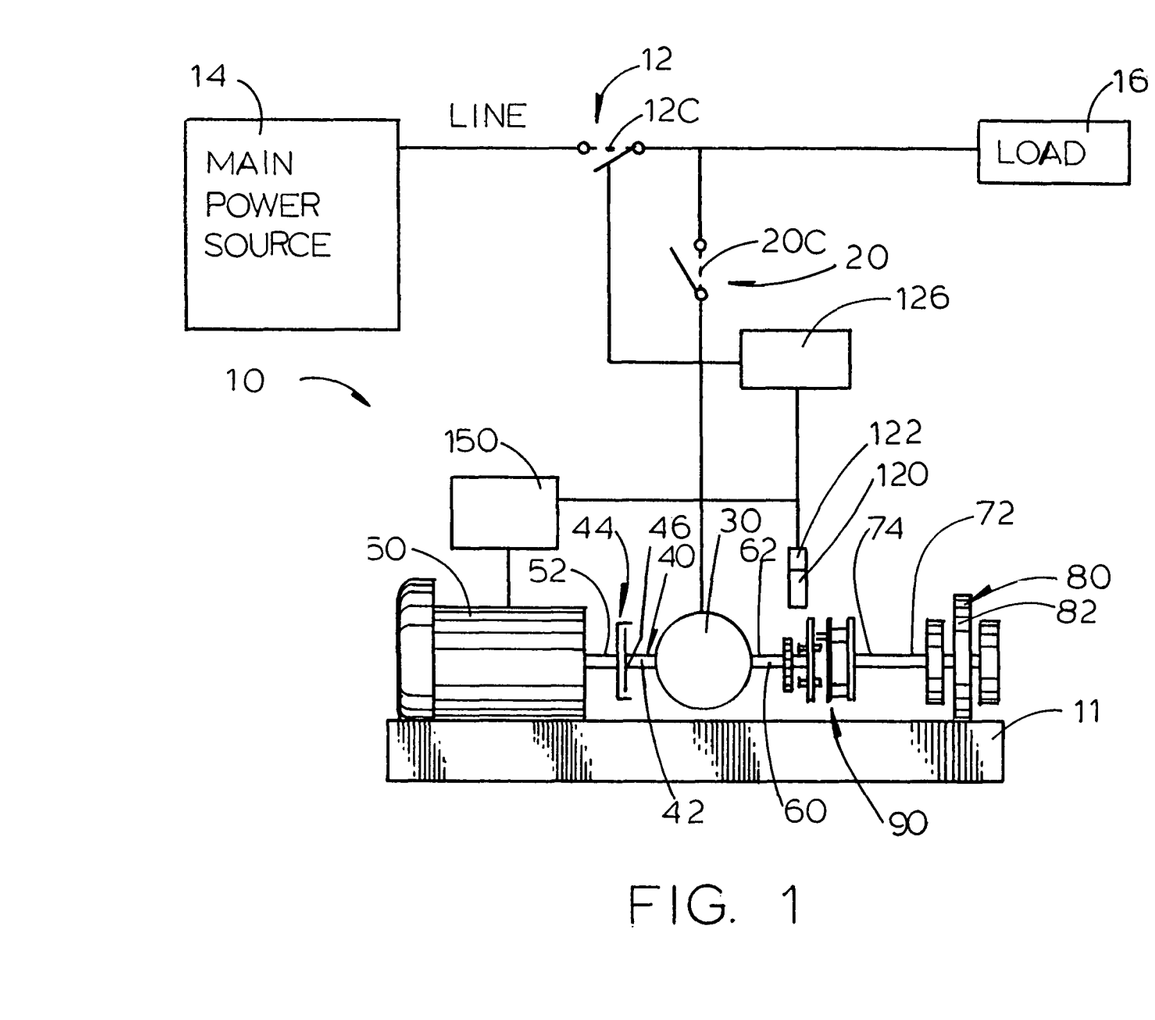
FIG. 1 is a schematic showing one form of a backup power system embodying the present invention.
Figure 2:
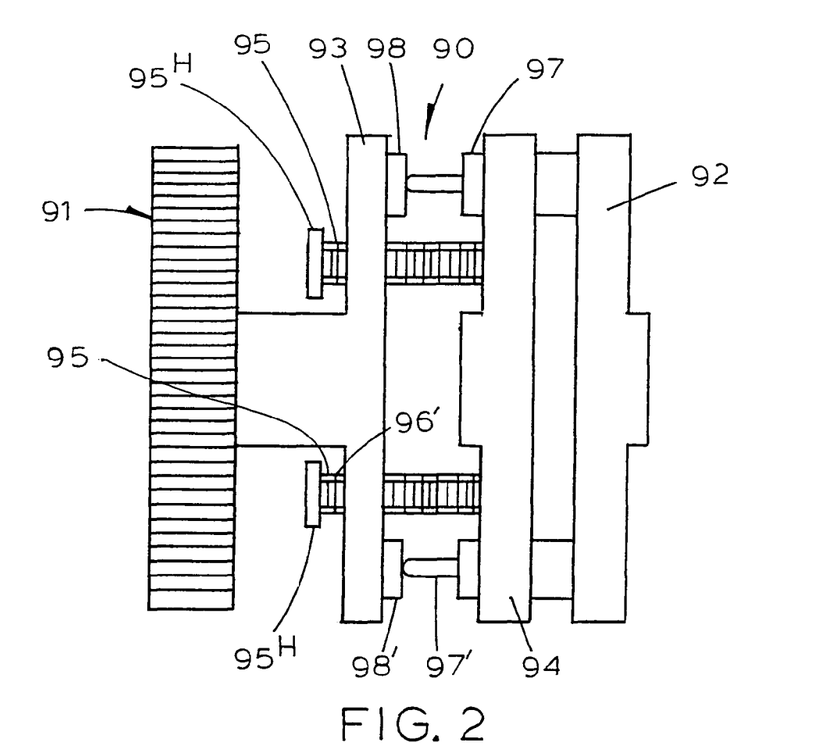
FIG. 2 shows the mechanical coupling used to connect a flywheel unit to a motor/generator unit and which uses linear displacement of an element as a control in activating a backup power unit in the event a operation of a main power unit is different from a desired level.
Figure 3:
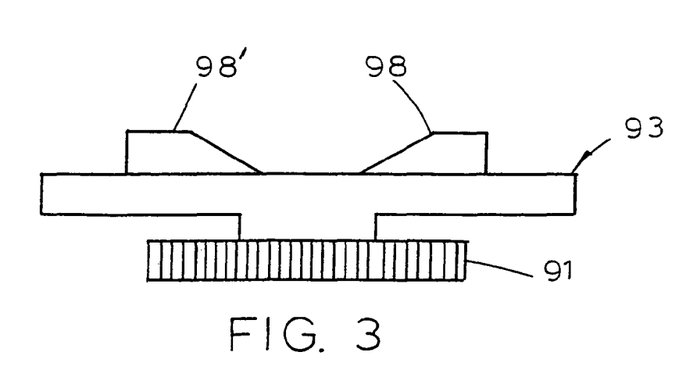
FIG. 3 shows the sensor plate used in the mechanical coupling.
Figure 4:
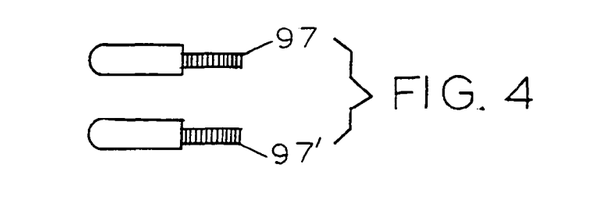
FIG. 4 shows threaded lifters, which are used, in the mechanical coupling.

Referring to FIGS. 1-3, it can be understood that the present invention is embodied in a backup power system 10. System 10 can be mounted on a skid 11.

System 10 comprises a line breaker switch 12, which is adapted to be electrically interposed between a main power source 14, such as a utility, and a load 16. Line breaker switch 12 has a closed condition which is indicated in FIG. 1 by dotted lines 12C, which electrically connects the main power source to the load and an open condition which is shown in solid lines in FIG. 1 which disconnects the load from the main power source.

A generator breaker switch 20 is electrically connected to the main power source in parallel with the load. Generator breaker switch 20 has a closed condition shown in FIG. 1 by dotted lines 20C and an open condition shown in solid lines in FIG. 1.

A generator/condenser unit 30 is electrically connected to the main power source via generator breaker switch to receive power when the line breaker switch is in the closed condition. Generator/condenser unit 30 has a main power source driven condition, a thermal engine driven condition and a flywheel driven condition as will be understood from the following disclosure.

A first drive shaft 40 is connected at one end 42 thereof to generator/condenser unit 30.

An overrunning clutch 44 is connected to first drive shaft 40 at a second end 46 of the first drive shaft.

A thermal engine 50 has an engine drive shaft 52 connected to generator/condenser unit 30 and via overrunning clutch 44 to drive the generator/condenser unit via the overrunning clutch when thermal engine 50 is activated.

A second drive shaft 60 is connected at a first end 62 thereof to generator/condenser unit 30. Second drive shaft 60 is rotate-ably driven by the generator/condenser unit when the generator/condenser unit is in the main power source driven condition and when the generator/condenser unit is in the thermal engine driven condition.

As discussed in U.S. Pat. No. 7,042,108, a clutch can be included in the system. The clutch can be any form of clutch, with a magnetic form being one form of such a clutch.

A shaft 70 includes a first portion 72 and a second portion 74, with the first portion 72 being connected to a flywheel assembly 80. The flywheel assembly includes a flywheel 82 which is rotated at a predetermined rotational speed by generator/condenser unit 30 when unit 30 is operating in the main power source driven condition and when the generator/condenser unit is in the thermal engine driven condition.

As can be understood from the foregoing, rotational device, generator/condenser unit 30 is associated with main power unit 14 in a manner such that when the main power unit is operating at a specified operational level, generator/condenser unit 30 operates at a first rotational speed and when the main power unit is operating at a second operational level that is different than the first operational level, the generator/condenser unit will operate at a second rotational speed. In the form shown, the second rotational speed of the generator/condenser unit is different from the first rotational speed to define a rotational speed differential. This rotational differential is used by the system embodying the principles of the present invention to activate a backup power unit, which is embodied in thermal engine 50 in the form shown in FIG. 1.

The speed differential is manifested using flywheel unit 80 coupled to the generator/condenser unit 30. The flywheel 82 is adapted to rotate and maintain rotation at the first rotational speed whereby when the generator/condenser unit is operating at the second rotational speed, the difference between the rotational speed of the flywheel unit and the second rotational speed is essentially equal to the rotational speed differential.

The system embodying the principles of the present invention further comprises a coupling unit 90, which is connected to the backup power unit and to the generator/condenser unit and to the flywheel unit. Coupling unit 90 translates the rotational speed differential into a linear distance with the linear distance being proportional to the speed differential.

A backup power unit activation unit (which will be discussed in greater detail below) is connected to the coupling unit to activate the backup power unit when the linear distance equals a preset value.

The use of linear measurement to sense a drop in power from the main power unit and to activate the backup power unit is much more efficient and reliable than using gear tooth sensing or other such electrical means.

More specifically, one form of the coupling unit 90 includes a gear 91 mounted on output shaft 60 for rotation therewith whereby gear 91 rotates at the same speed as shaft 60 and hence at the same rotational speed as generator/condenser unit 30. Rotational speed changes in generator/condenser unit 30 will be identically reflected in rotational speed changes in the rotational speed of gear 91. Coupling unit 90 further includes a base element 92 coupled to shaft 74 for rotation therewith whereby base element 92 rotates at a speed that is identical to the rotational speed of the flywheel. As discussed above, when the main power source is operating at a desired level, generator/condenser unit 30 operates at a first rotational speed, and this speed is matched by the rotational speed of the flywheel in flywheel unit 80. However, if the power level of the main power source drops, this drop in power level will be reflected in a change of rotational speed of the generator/condenser unit. However, since the flywheel will tend to maintain its rotational speed, the drop in rotational speed of the generator/condenser unit will create the above-mentioned speed differential. This rotational speed differential is sensed by unit 90 and translated into a linear measurement.

Coupling unit 90 translates rotational speed differential into linear measurement using two elements 93 and 94, which are movably coupled together to move linearly with respect to each other when one element rotates at a speed that differs from the rotational speed of the other element. Specifically, element 93 is coupled to gear 91 for rotation therewith and element 94 is coupled to 92 for rotation therewith. As can be understood from FIGS. 5A-5C, element 93 has two accurate cutouts 94 and 94' defined there through and bolts 95 and 95' extend through these cutouts. The bolts have heads 95H thereon and have compression springs 96 and 96' surrounding the bodies thereof. The bolt heads will engage one surface of the element 93 to prevent that element from slipping off the bolts, and the springs are interposed between element 93 and the bolt heads and bias element 93 linearly towards element 94. As can be understood from the teaching of this disclosure, element 93 can move rotationally with respect to element 94 because bolts 95 and 95' are located in the accurate cutouts, and element 93 can also move linearly toward element 94 due to the bias of the springs.

Linear movement of element 93 away from element 94 is used to control activation of the backup power supply. This movement is created by two projections 97 and 97' which are fixedly mounted on element 94 to thus move at a rotational speed essentially equal to the rotational speed of the flywheel and which abut-tingly engage two associated ramps 98 and 98' mounted on element 93. The ramps are also shown in FIG. 3. As can be understood, when element 94 rotates as a rotational speed different from the rotational speed of element 93, there will be a circumferential movement of element 94 with respect to element 93. This circumferential movement will cause the projections 97 and 97' to slide up the ramps 98 and 98', thereby forcing element 93 away from element 94. This is the translation of a difference in rotational speed into a linear dimension.

Figure 5A:
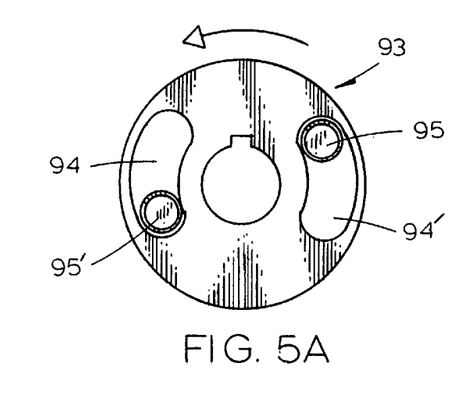
FIG. 5A shows an element of the mechanical coupling shown in FIG. 2 with the direction of rotation of the coupling under the influence of a motor/condenser unit being indicated.
Figure 5B:
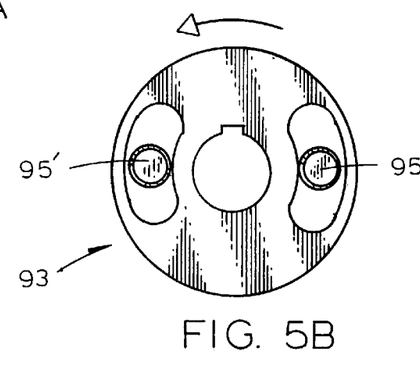
FIG. 5B shows the coupling element shown in FIG. 5A during a transition during a power interruption.
Figure 5C:
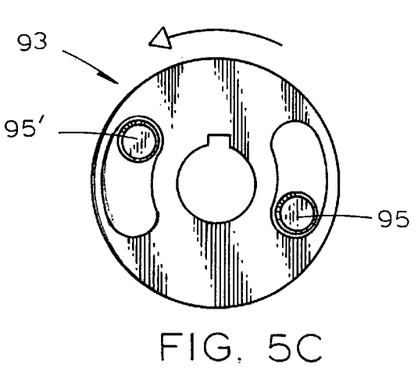
FIG. 5C shows the coupling element shown in FIG. 3A with the direction of rotation of the coupling under the influence of a flywheel being indicated.

As shown in FIGS. 5A-5C, element 93 of the shaft coupling unit moves between a source power driven configuration shown in FIG. 5A, a thermal engine driven configuration, also shown in FIG. 5A, a transition configuration shown in FIG. 5B and a flywheel driven configuration shown in FIG. 5C, with each bolt engaging a first end 116 of a slot accommodating when the bolts of the shaft coupling unit are in the main power source driven configuration and in the thermal engine driven configuration, and each bolt engaging a second end 118 the slot accommodating each stop pin when the element 94 of the shaft coupling unit is in the flywheel driven configuration. Both bolts being spaced apart from both the first end and the second end of the slot accommodating the bolt when the shaft coupling unit is in the transition configuration.

A gear sensor 120 is located adjacent to the toothed gear on the shift coupling unit. Gear sensor 120 senses the linear location of gear 91 through various means. When the gear 91 moves under the influence of element 93, such movement is sensed by sensor 120. When the linear movement of gear 91 exceeds a preset amount, a signal is generated and sent to a sensing circuit 126.

A comparator circuit 128 compares an initial location of gear 91, which is a reference position and is established when main power unit 14 is operating at optimal power, and a new location of gear 91 which is caused by movement of element 93 due to the difference in rotational speed between elements 93 and 94 as translated by the ramp engagement of projections 97 and 97'. When gear 91 has moved a preset distance away from the reference position, comparator circuit 128 generates an activation signal Line breaker switch 12 is opened upon receiving the activation signal from the comparator circuit and moves from a closed condition to an open condition.

A thermal engine controller 150 is connected to thermal engine 50 and to comparator circuit 128 to activate and de-activate the thermal engine. Thermal engine 50 is activated when the thermal engine controller receives the activation signal from comparator circuit 128.

Figure 6A:
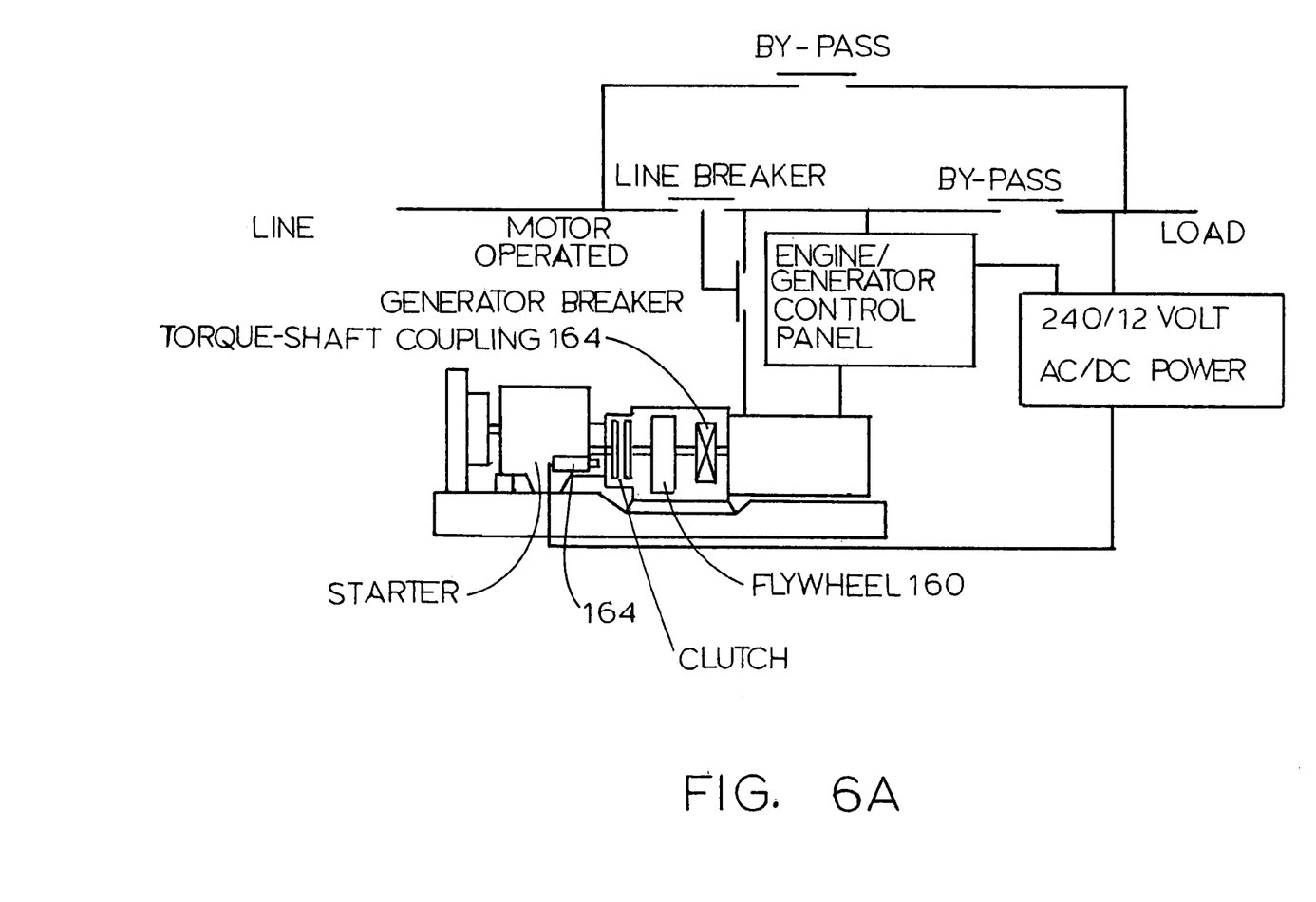
FIG. 6A is a schematic showing another form of a backup power system embodying the present invention.
Figure 6B:
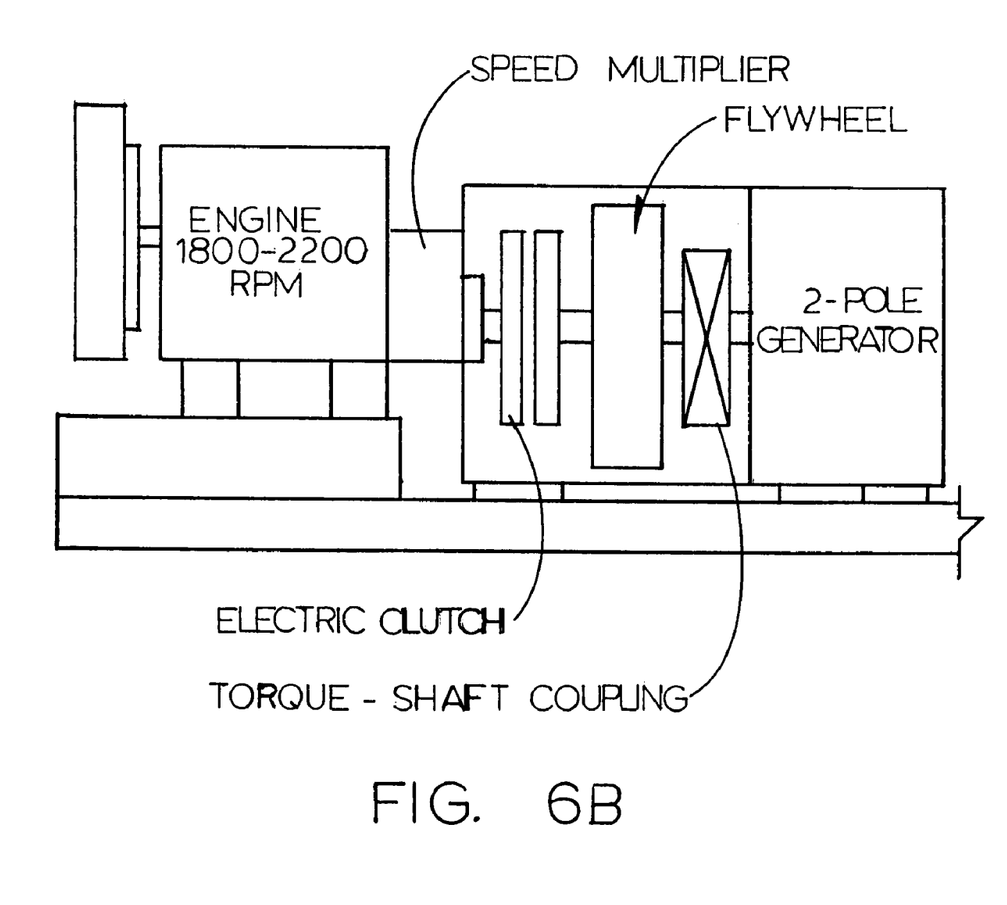
FIG. 6B shows the mechanical coupling of the system shown in FIG. 6A.

FIGS. 6A and 6B show a schematic representation of another form of the system including the coupling unit of the present invention. In the system shown in FIGS. 6A and 6B, the mechanical coupling includes a flywheel 160 mounted on a shaft 162 which is also connected to a mechanical coupling 90 as discussed above. Movement of the sensor plate element 93 is detected by sensor 164, which is coupled to the backup power supply as discussed above.

Figure 7:
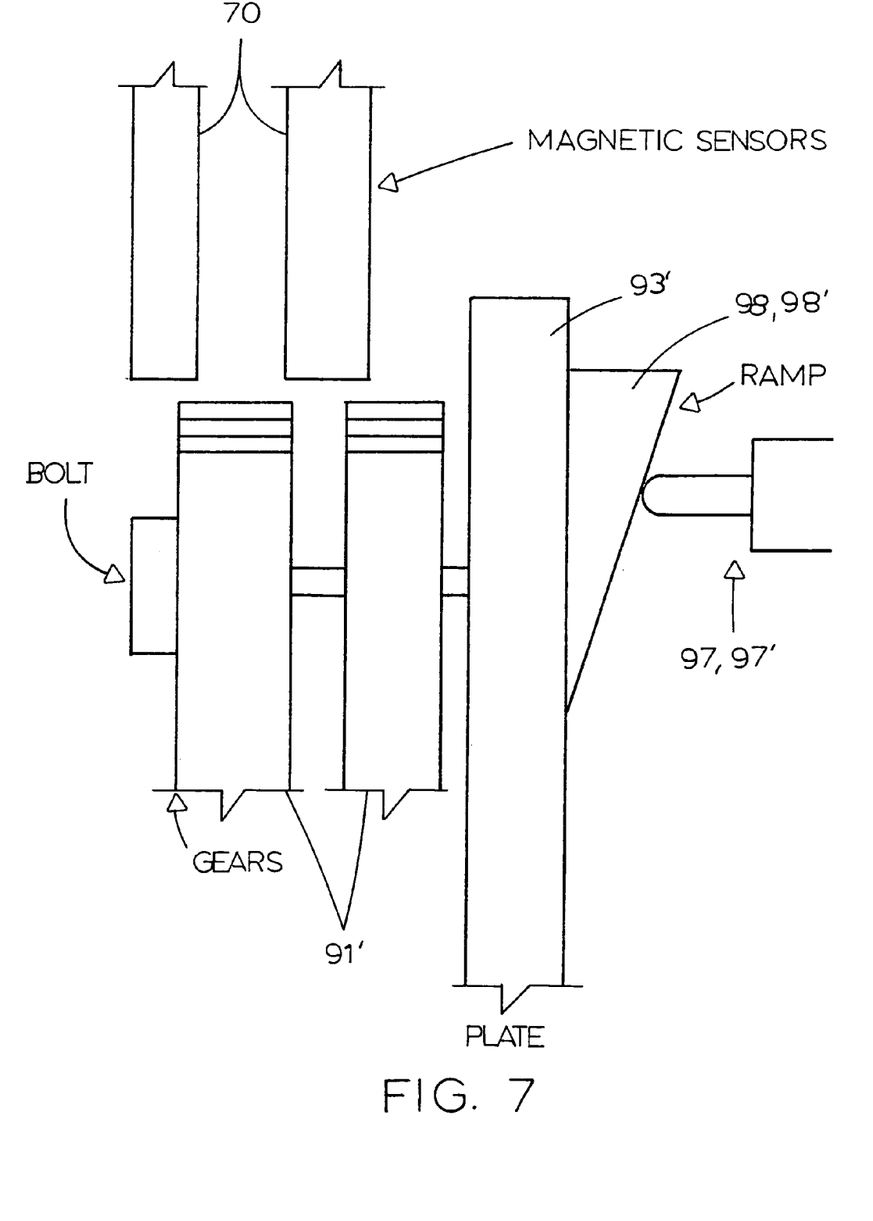
FIG. 7 shows another form of the mechanical coupling of the present invention.

A further form of the coupling unit is shown in FIG. 7 as coupling unit 90' and uses magnetic sensors 170 to monitor movement of the sensor plate 93' via gears 91'.

Objectives of the backup system embodying the present invention are: to provide a failsafe mechanical power failure detection device; totally isolated power supply to all monitoring devices that control the entire system function; as well as to provide a reliable means and a redundant means of engine starting power.

The movement of the gear can be detected magnetically (see FIG. 7) or using lasers or using a mechanical switch that is located on shaft 60 and which is triggered when gear 91 moves into contact therewith. The location of the mechanical switch is set so that the switch is triggered when the rotational speed differential between the flywheel and the generator/condenser unit reaches a preset limit. Gear 91 can also be replaced by a simple wheel having luminous tape on the outer circumference thereof, with the tape being detected by sensor 120.

System start up is fully described in U.S. Pat. No. 7,042,108, and such description is incorporated herein by reference.

It is noted that the system embodying the principles of the present application does not use engine crank batteries. The inventor has found that batteries are unreliable, and a system which does not use such batteries is thus more reliable, In the system of the present invention, engine crank power comes from either the utility or from the synchronous condenser through the power supply.

Figure 8:
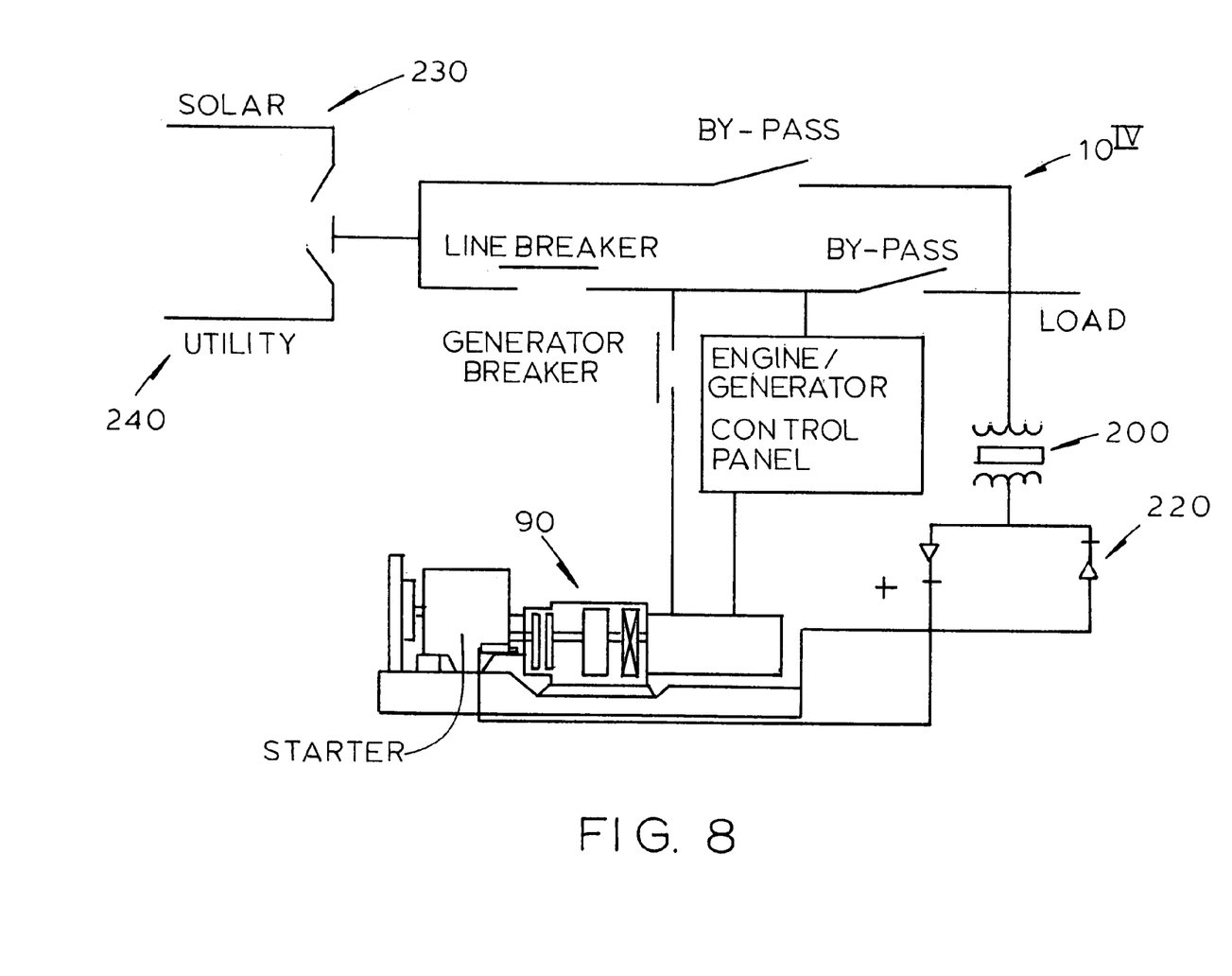
FIG. 8 shows a battery-free continuous power system, which uses the mechanical coupling of the present invention.

The system of the present invention can use a step-down transformer and rectifier assembly in place of engine crank batteries. Such a system is shown in FIG. 8 as system $10^{IV}$. It is also noted that all products using the Synchronous Condenser technology can use the system shown in FIG. 8 for engine start. For larger units, such as 500 KVA and up, a Three Phase Transformer and Bridge rectifier can be used and sized according to manufacturer's starter motor specifications. Thus, the use of batteries is avoided.

As shown in FIG. 8, for remote critical load protection, the batteries are replaced by a power supply. A 240 VAC 5 kva Transformer 200, connected to a 400 Amp Bridge Rectifier 220 provide engine crank power from the utility or the Synchronous Condenser. The CPS can provide harmonic free dynamic continuous power while operating on solar energy 230 or utility power 240 or engine power if there is no electric power available. There will be no interruptions of power to the load during load transfer.

It is understood that while certain forms of the present invention have been illustrated and described herein, it is not to be limited to the specific forms or arrangements of parts described and shown.

What is claimed is:

1. A means for sensing speed differential between two rotating elements for use on a power system to activate a backup power generator when a primary power generator shuts down comprising:
   A) a sensor plate connected to a first rotating element for rotation therewith, the first rotating element rotating at a first rotational speed;
   B) a ramp on the sensor plate;
   C) a base connected to a second rotating element for rotation therewith, the second rotating element rotating at a second rotational speed;
   D) an element fixed to the base in a position to slid-ably engage the ramp when the first and second rotational speeds differ from each other; and
   E) a coupling element movably coupling the base to the sensor plate so the sensor plate moves away from the base as the element engages the ramp.

2. The means defined in claim 1 wherein the first rotating element is a flywheel unit and the second rotating element is a motor/generator unit.

3. The means defined in claim 2 further including a second ramp on the sensor plate.

4. The means defined in claim 3 wherein the coupling element includes an element, which biases the sensor plate towards the base.

5. The means defined in claim 1 further including a gear connected to the sensor plate for rotation therewith.

6. The means defined in claim 1 further including a switch connected to the sensor plate.

7. The means defined in claim 6 wherein the switch is a laser-activated switch.

8. The means defined in claim 6 wherein the switch is a mechanical switch.

9. The means defined in claim 6 wherein the switch includes a plurality of stages.

10. A means for sensing speed differential between two rotating elements comprising:
   A) a motor/generator which is coupled to a main power source, the motor/generator rotating at a first rotational speed when the main power source is operating at a suitable operational level and rotating at a second rotational speed when the main power source is operating at less than the suitable operational level;
   B) a flywheel which is coupled to the motor/generator unit by the coupling to rotate therewith in a manner such that the flywheel rotates at the first rotational speed when the main power source is operating at the suitable power level and maintains the first rotational speed when the main power source is operating at less than the suitable operational level and which decouples the flywheel from the motor/generator when the motor/generator rotates at the second rotational speed so that the flywheel and the motor/generator rotate at different rotational speeds when the main power source is operating at less than the suitable operational level and a differential rotational speed is defined by the difference between the first and second rotational speeds;
   C) a sensor plate connected to the flywheel for rotation therewith;
   D) a ramp on the sensor plate;
   E) a base fixed to the motor generator for rotation therewith;
   F) a bolt fixed to the base in a position to slidably engage the ramp when the flywheel is rotating at the first rotational speed and the motor/generator is operating at the second rotational speed; and
   G) a coupling element movably coupling the base to the sensor plate so the sensor plate moves away from the base as the bolt engages the ramp and moves toward the base when the bolt is not engaged with the ramp.

11. A power system comprising:
   A) a main power supply which includes a main power source and a generator/condenser unit connected to the main power source to rotate at a first rotational speed when the main power source is operating at a suitable operational level and to rotate at a second rotational speed when the main power source is operating at a level different that the suitable operational level with the second rotational speed being different from the first rotational speed;
   B) a flywheel unit which is adapted to rotate at the same rotational speed as the generator/condenser unit when the main power source is operating at the suitable speed and to maintain such rotational speed when the generator/condenser unit is operating at the second rotational speed thereof whereby the flywheel unit rotates at a rotational speed that differs from the rotational speed of the generator/condenser unit when the main power source is operating at a level different from the suitable operational level;
   C) a coupling unit coupling the flywheel unit to the generator/condenser unit and which includes
      (1) a first element coupled to the flywheel unit for rotation therewith,
      (2) a second element coupled to the generator/condenser unit for rotation therewith,
      (3) the first element being linearly movable with respect to the second element, and
      (4) a coupling system which couples the first element to the second element and which includes elements which move the first and second elements linearly with respect to each other when the rotational speed of the flywheel unit differs from the rotational speed of the generator/condenser unit;
   D) a sensor unit which senses relative linear movement of the first and second elements; and
   E) a backup power supply which is connected to the sensor unit to be activated when the first and second elements have moved linearly with respect to each other by a preset amount.

12. The power system defined in claim 11 wherein the relative linear movement between the first and second elements of the coupling unit is proportional to the difference between the first and second rotational speeds.

13. The power system defined in claim 12 wherein the coupling system of the coupling unit includes a ramp on the first element and a ramp-engaging element on the second element slidably engaging the ramp.

14. The power system defined in claim 12 wherein the sensor unit includes a mechanical switch.

15. The power system defined in claim 12 wherein the sensor unit includes a laser unit for sensing relative linear movement between the first and second elements of the coupling unit.

* * * * *